(12) United States Patent
Mongazon-Cazavet et al.

(10) Patent No.: US 7,155,536 B2
(45) Date of Patent: Dec. 26, 2006

(54) FAULT-TOLERANT IS-IS ROUTING SYSTEM, AND A CORRESPONDING METHOD

(75) Inventors: Bruno Mongazon-Cazavet, Michel-sur-Orge (FR); Jean-Pierre Rombeaut, Maubeuge (FR)

(73) Assignee: Alcatel, Paris (FR)

( * ) Notice: Subject to any disclaimer, the term of this patent is extended or adjusted under 35 U.S.C. 154(b) by 818 days.

(21) Appl. No.: 10/273,168

(22) Filed: Oct. 18, 2002

(65) Prior Publication Data

US 2003/0084371 A1    May 1, 2003

(30) Foreign Application Priority Data

Oct. 25, 2001  (FR) .................................. 01 13804

(51) Int. Cl.
  *G06F 15/173* (2006.01)
(52) U.S. Cl. ...................... 709/242; 709/238; 709/239; 709/244; 370/433
(58) Field of Classification Search ................ 709/242, 709/244, 238, 239; 370/389, 433, 395, 520, 370/400, 401; 714/1, 13
See application file for complete search history.

(56) References Cited

U.S. PATENT DOCUMENTS

| | | | |
|---|---|---|---|
| 5,243,592 A * | 9/1993 | Perlman et al. | 370/252 |
| 6,049,524 A * | 4/2000 | Fukushima et al. | 370/220 |
| 6,148,411 A | 11/2000 | Ichinohe et al. | |
| 6,262,976 B1 * | 7/2001 | McNamara | 370/254 |
| 6,418,139 B1 * | 7/2002 | Akhtar | 370/356 |
| 6,577,634 B1 * | 6/2003 | Tsukakoshi et al. | 370/395.31 |
| 2002/0078232 A1 * | 6/2002 | Simpson et al. | 709/238 |
| 2002/0093954 A1 * | 7/2002 | Weil et al. | 370/389 |
| 2002/0118641 A1 * | 8/2002 | Kobayashi | 370/230 |
| 2002/0131362 A1 * | 9/2002 | Callon | 370/216 |
| 2003/0093559 A1 * | 5/2003 | Ichinohe et al. | 709/239 |

OTHER PUBLICATIONS

J. Aweya, "On the Design of IP Routers Part 1: Router architectures", Journal of Systems Architecture, Elsevier Science Publishers, Amsterdam, NL, vol. 46, No. 6, Apr. 2000, pp. 483-511, XP004190486.

R. Callon, "Use of OSI IS-IS for routing in TCP/IP and Dual Environments" RFC 1195, Dec. 1990, pp. 1-84 XP002206496.

* cited by examiner

*Primary Examiner*—Frantz B. Jean
(74) *Attorney, Agent, or Firm*—Sughrue Mion, PLLC

(57) ABSTRACT

The invention provides a high availability control method for a router in an autonomous system, the router being in communication with other routers using an IS—IS protocol via interfaces and presenting both an active IS—IS protocol engine and a standby IS—IS protocol engine. The method comprises steps of storing data concerning adjacency, the state of links, and interfaces in a memory of the active protocol engine, updating the data stored in a memory of the standby protocol engine, and activating the standby protocol engine using the updated data. The invention also provides a router implementing the method. The invention serves to increase router availability in the event of a failure or of maintenance actions.

11 Claims, 2 Drawing Sheets

FAULT-TOLERANT IS-IS ROUTING SYSTEM, AND A CORRESPONDING METHOD

The present invention relates to IS—IS protocol routing in autonomous systems, and it relates more particularly to internet protocol (IP) routers.

BACKGROUND OF THE INVENTION

Routers, also known as intermediate systems "IS", are known, for example the Alcatel 7670 RSP router, which present operating discontinuities due to periods of unavailability. Periods of unavailability are due firstly to planned operations, such as router maintenance, and secondly to unexpected events, such as router failures. When other routers detect that a router has stopped or failed, their data concerning routing via the unavailable router is made invalid. When the router is put back into operation, all of that routing data is lost and needs to be exchanged anew with the other routers. This gives rise firstly to an increase in traffic on the network. It also gives rise to problems of accessibility on the network. Periods of router unavailability thus inconvenience users of the network.

A project for extending the IS—IS protocol has been proposed by the internet engineering task force (IETF) under the reference "Restart signaling for IS—IS" in order to enable programmed restarting of a router in a manner that reduces those drawbacks. However the corresponding protocol is neither available nor even tested. That project makes no provision for unplanned restarts. That project does not appear to be adequate for providing a sufficient increase in router availability. That project also requires changes to the standards concerning the IS—IS protocol. There is no prospect in the short term of changing the standards of the IS—IS routing protocol since that would require present routers to be updated or replaced.

OBJECTS AND SUMMARY OF THE INVENTION

There therefore exists a need for a router which solves one or more of the drawbacks in the state of the art.

The invention thus proposes a method of controlling a router in an autonomous system, the router being in communication with other routers using an IS—IS protocol via interfaces and presenting: an active IS—IS protocol engine; and a standby IS—IS protocol engine; the method comprising the steps of: the router communicating with other routers via the active protocol engine; storing the following in a memory of the active protocol engine: data concerning the adjacency of the other routers; data concerning the state of links with the other routers; and data concerning the interfaces; updating the data stored in a memory of the standby protocol engine on the basis of the data in the active router concerning adjacency, the state of the links, and the interfaces; and activating the standby protocol engine with the updated data, by using the IS—IS protocol with the other routers.

In a variant, all of the data is updated at the request of the standby protocol engine.

In another variant, the method further comprises a step of detecting a modification of the data stored in a memory of the active protocol engine, with updating being performed whenever a modification of said data is detected.

In another variant, the detected modification is selected from the group constituted by: adjacency activation; adjacency deactivation; adjacency data being modified, possibly after receiving a presence declaration packet; modifications, deletions, and creations relating to the states of links and of interfaces.

In yet another variant, the step of activating the standby protocol engine includes a step of validating the preserved adjacency and link state data without modifying the IS—IS protocol.

Provision can also be made for the standby protocol engine to perform a shortest path search on the basis of the updated data.

In a variant, activation of the standby protocol engine includes a step of verifying the validity of its adjacency data.

In another variant, validity verification comprises: sending an IIH PDU data packet from the standby protocol engine to an adjacent router, the packet containing a request that the adjacent router send a CSNP data packet; and modifying the adjacency data as a function of the nature of the response from the adjacent router.

The invention also provides a communication method comprising the following steps: sending an IIH PDU data packet from a first router to an adjacent second router, the packet including a parameter at a predetermined location; sending a CSNP data packet from the second router to the first router as a function of the value of said parameter of the IIH PDU data packet.

The invention also provides an IS—IS communication protocol in which an IIH PDU data packet contains a request for a CSNP data packet to be sent.

The invention also provides a router presenting a plurality of interfaces via which it is capable of communicating with other routers using an IS—IS protocol, the router comprising: an active IS—IS protocol engine; a standby IS—IS protocol engine; a communications channel between the protocol engines; a least one data storage memory in communication with the active protocol engine; and at least one data storage memory in communication with the standby protocol engine.

BRIEF DESCRIPTION OF THE DRAWINGS

Other characteristics and advantages of the invention appear on reading the following description of embodiments of the invention given by way of example and with reference to the drawings, in which.

MORE DETAILED DESCRIPTION

The invention thus proposes a method in which the databases of an active IS—IS protocol engine are used to update the databases of an IS—IS protocol engine on standby. The active protocol engine uses a determined IS—IS routing protocol for communication with other routers in an autonomous system or AS. The term "autonomous system" or "AS" is used to designate an autonomously controlled administrative entity. When the active protocol engine becomes unavailable, the standby protocol engine becomes active and communicates with other routers, using the updated databases and the routing protocol as used by the active protocol engine.

Figure 1:
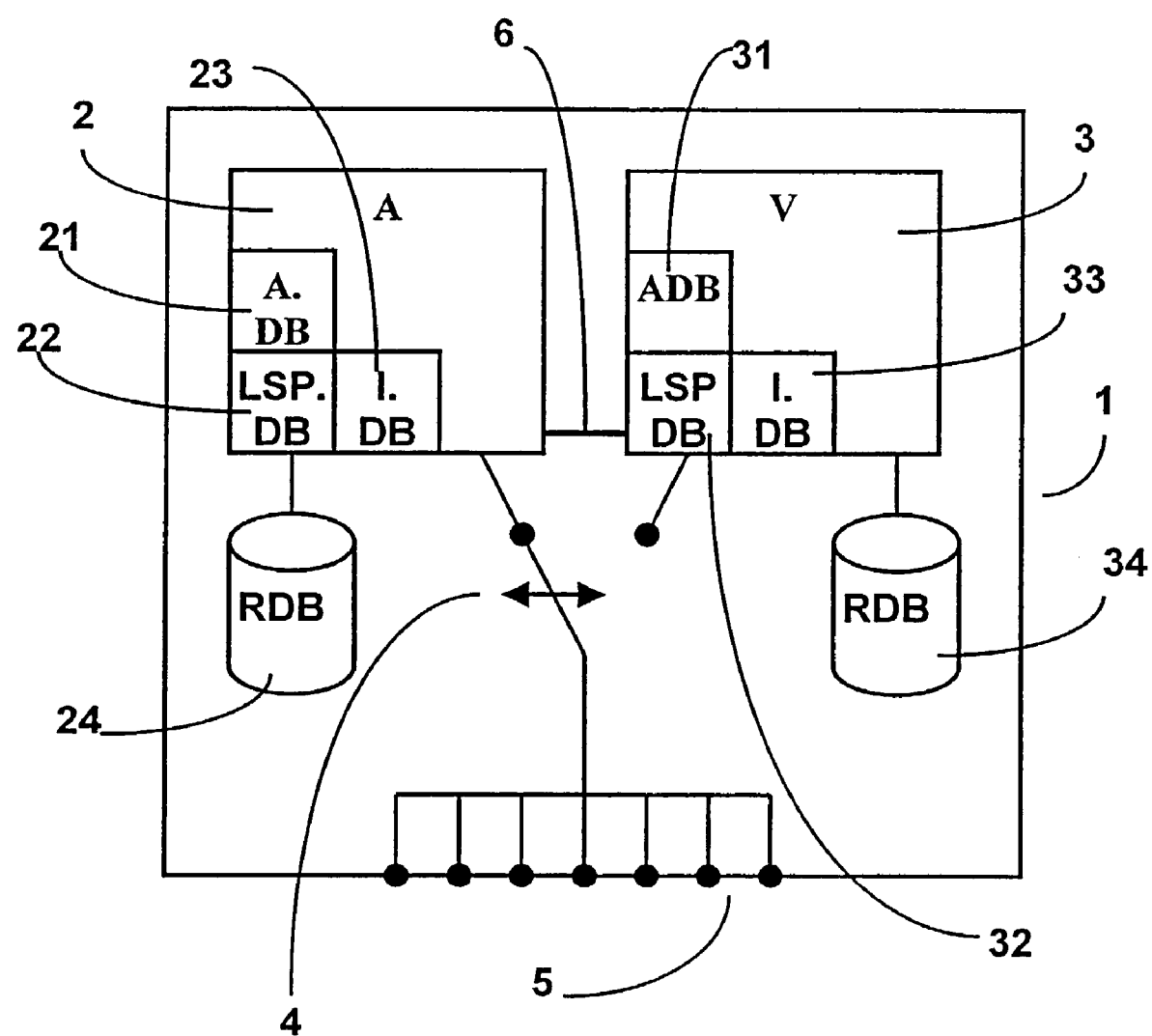
FIG. 1 is a diagram of a router in accordance with the invention.

FIG. 1 is a diagram showing the structure of a router 1 of the invention. This router 1 comprises an active protocol engine 2. The router 1 also comprises a standby protocol engine 3 designed to take over from the active protocol engine 2 in the event of it failing. These IS—IS protocol engines are defined in the request for comment (RFC) No. 1142 standard of February 1990 and in the international standards organization (ISO) standard 10589 version 2. The protocol engines 2 and 3 are connected together by a connection 6 which forms a communications channel between them. A switch 4 enables the active protocol engine 2 or the standby protocol engine 3 to be put into communication selectively with the inlet/outlet interfaces 5 of the router. Although the communications protocol engines 2 and 3 in the example shown are constituted by different hardware components, such as different cards connected together by the connection 6, it is naturally also possible to provide for the protocol engines to be formed by executable programs running in parallel, preferably on distinct hardware elements that are capable of communicating with each other.

The active protocol engine 2 includes or is connected to a storage memory, e.g. a cache memory. In similar manner, the standby protocol engine 3 includes or is connected to a storage memory, which can likewise be a cache memory.

The memories of the protocol engines serve in particular to store adjacency databases 21 and 31, databases 22 and 32 concerning the state of links, and databases 23 and 33 concerning the state of the interfaces.

In general manner, the content of the databases of a protocol engine is specified in the standards RFC 1142 and 1195.

An adjacent database (ADB) contains in particular descriptions of other IS—IS protocol engine routers to which the router 1 is connected.

A link state database (LSP DB) contains data concerning the state of links throughout the networks and the routers of the autonomous system or AS.

By way of example, an interface state database contains flags concerning the state of interfaces, information about interface parameters, or indeed about the presence of a router DIS connected to an interface.

It is also possible to provide each protocol engine with a database containing timers.

The method of operation of the router may be as follows.

Initially, a step of starting the standby protocol engine 3 can be provided. This starting of the standby protocol engine is performed, for example, when the router is switched on. During this starting step, the functions of sending "hello" packets or IIH by the standby protocol engine 3 are inhibited, for example. Hello or IIH packets are packets for signaling presence that are generally sent at regular intervals by a protocol engine over the network to indicate that the router is present and to give information concerning it. This inhibition may be implemented, for example, by blocking the corresponding timers in the standby protocol engine.

In parallel, the active protocol engine 2 communicates by using IS—IS protocol with other routers of the autonomous system AS. While communicating with other routers, the active protocol engine recovers data concerning interfaces, adjacent routers, and the state of links. The active protocol engine receives in particular IS—IS data coming from other routers in the form of hello packets, in the form of LSP packets, or link state packets, in the form of CSNP packets, i.e. a list of the LSPs known to a router, or in PSNP form. The active protocol engine stores this data in its memory in the databases 23, 21, and 22 respectively.

Certain databases of the active protocol engine 2, and in particular the databases containing interface data, link state data, and adjacency data, are subsequently transmitted in full to the standby protocol engine 3. Naturally, the databases can be sent in full at intervals that are spaced apart in time in the form of packets so as to avoid interfering with the operation of the active protocol engine 2. Provision can be made for the standby protocol engine 3 to deliver acknowledgments of receipt to the active protocol engine 2. The active protocol engine 2 then knows that the data in the standby protocol engine 3 has been updated.

This transmission may be performed either on the initiative of the active protocol engine 2, or at the prior request of the standby protocol engine. Provision can thus be made for the standby protocol engine 3 to request resynchronization, with the active protocol engine 2 responding thereto by sending databases. Such a request is sent, for example, at the end of the process of starting the standby protocol engine 3.

When starting a router, a local memory zone is created, for example, in the standby protocol engine to store databases concerning adjacencies, link states, and interfaces. The memory enables data to be created, modified, and deleted.

The data received is then stored in the databases of the standby protocol engine 3. The databases containing interface data, link states, and adjacency data in the standby protocol engine 3 are then up to date, thus enabling the standby engine to be activated should that be necessary in the event of the active protocol engine 2 failing. The standby protocol engine 3 may also prepare to receive and process subsequent updates.

In a variant, the active protocol engine subsequently sends its databases to the standby protocol engine 3. It is preferable to update the data in the standby protocol engine 3 incrementally, i.e. by sending only data that has changed since the most recent update to the standby protocol engine 3.

Provision can thus be made to detect any modification to the data in the memory of the active protocol engine. The data in the standby protocol engine 3 can then be updated whenever a modification is detected. In particular, updating can be performed if one of the following modifications is detected: activating adjacency; deactivating adjacency; modifications to adjacency data optionally due to receiving a packet declaring presence; or modifications, deletions, and creations relating to the state of links and of interfaces. This variant makes it possible to send incremental data updates from the active protocol engine 2 to the standby protocol engine. This can reduce the quantity of data that is exchanged between the protocol engines. This avoids the active protocol engine 2 being excessively occupied in sending data to the detriment of performing routing tasks. Such updating guarantees that the database of the standby protocol engine 3 benefits from being recently up to date in the event of the active protocol engine 2 failing.

Provision can be made for the standby protocol engine 3 to implement a process for finding shortest paths or SPF on the basis of its own databases updated prior to its activation.

There follows a description of an example of activating the standby protocol engine.

Following one or more updates, the standby protocol engine 3 has one of the latest images of adjacency data, interface data, and link state data from the active protocol engine 2 in its own memory. The standby protocol engine is thus ready to take over from the active protocol engine in the event of the active protocol engine ceasing to operate. The standby protocol engine can then operate as the active protocol engine using the IS—IS protocol initially used by the active protocol engine. Activating the standby protocol engine then corresponds to warm starting the router with operational routing information.

When the standby protocol engine switches to its active state, its configuration may be reinitialized. The standby protocol engine may create preserved interfaces, adjacencies, and link states. Preserved interfaces, adjacencies, and link states are adjacencies whose state is considered as being active or UP after the latest update of the standby protocol engine.

During its activation, the inhibits on the standby protocol engine are eliminated. The times for sending data such as LSPs and hello packets are activated. The standby protocol engine then sends LSPs to the other routers. The standby protocol engine verifies the validity of its own databases. In particular, it verifies the validity of its own adjacency database in a so-called "2-way check". It also verifies the validity of its own LSP database.

For the step of restarting an interface, the following sequence of events can be provided:

Initially, a search is made for the UP adjacencies connected to the given interface. These adjacencies are then classified as a function of the role they perform in the network. For example, an adjacent router serving only to perform internal routing within an area of the autonomous system or AS is referred to as being of "level 1". An adjacent router having a routing function in the backbone of the autonomous system AS is referred to as being of "level 2". The way in which interfaces are restarted varies depending on interface type.

Figure 2:
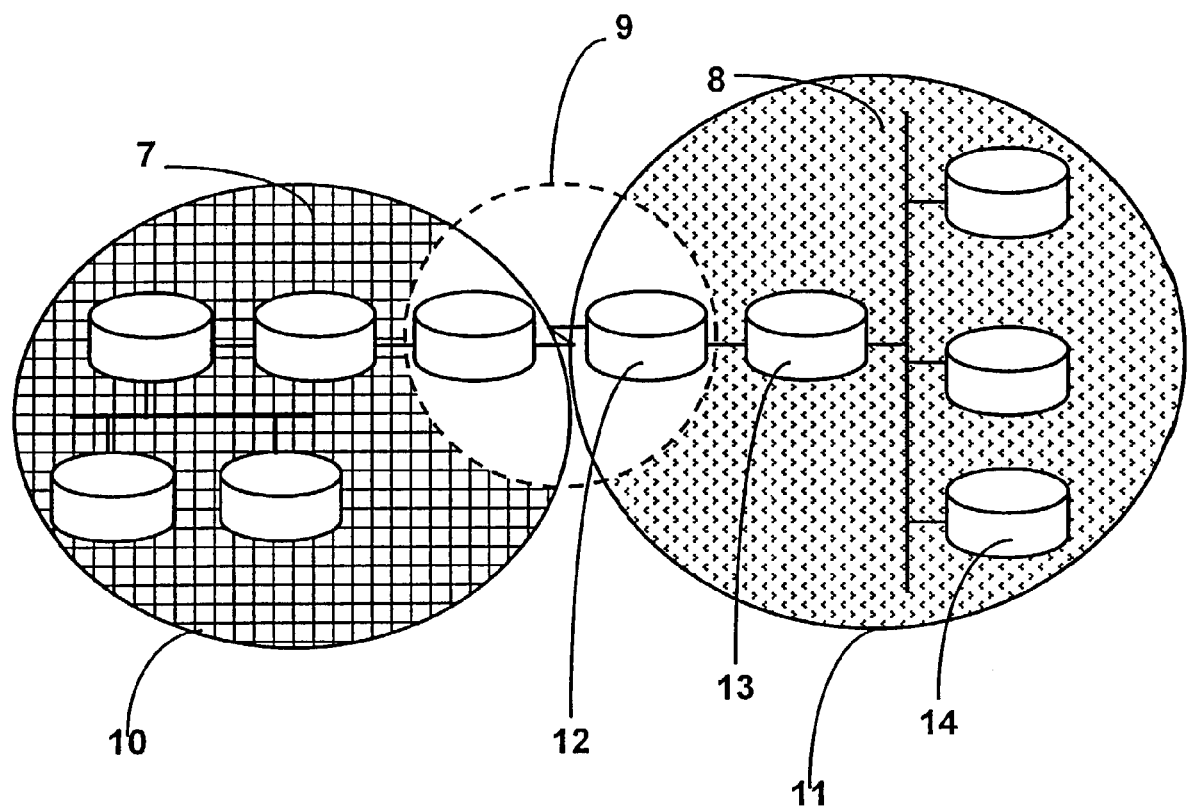
FIG. 2 is a diagram of a communications network in which one or more FIG. 1 routers are used.

In the example of FIG. 2, the cross-ruled portion corresponds to a first area 7. The spotted portion corresponds to a second area 8. The portion having a white background corresponds to the backbone of the autonomous system AS. Routers lying within the solid outlines 10 and 11 are level 1 routers. Routers lying within the dashed outlines are level 2 routers.

Two types of interface are distinguished: an interface providing connection with a local area network (LAN) which may be a broadcast or a non-broadcast space multiple-access network, e.g. the interface providing a connection between routers 13 and 14; and a point-to-point (PTP) connection interface, e.g. the connection interface between routers 12 and 13.

LAN Interface

If a level 1 or 2 adjacency is UP on the interface, a data packet (PDU) of the IS—IS hello type (IIH) for a LAN network is prepared. The list of all of the same-level adjacencies that are UP is included for this interface in the appropriate TLV field of this IIH PDU data packet. The connection level local address or MAC address is also added concerning each of these adjacencies in the IIH PDU packet. Thereafter the IIH PDU packet is sent over the interface. The adjacencies processed in this way are marked as being in the "2-way check" state in the adjacency database of the router.

PTP Interface

If an adjacency has been found, and regardless of its role level, the adjacency is marked as being in the "2-way check" state in the adjacency database of the router. An IIH PDU packet is prepared and then sent over the interface. The MAC address of the adjacency is included in this IIH PDU packet. If the "3-way handshake" protocol extension is available, a "point-to-point adjacency state" option may be added to the IIH PDU packet. This option makes it possible to recover the states seen by adjacent routers in the TLV field of the IIH PDU packet. The "adjacency state" value of this option must then mention an UP state. If other fields of the "adjacency state" option are also supported, e.g. the extended MAC address field, they are also used in the IIH PDU packet as sent.

After an interface has restarted, all of the corresponding adjacencies which were in the UP state during the failure are placed in the "2-way check" state. The "2-way check" state is not visible to other routers. In addition, for each interface possessing at least one adjacency in the "2-way check" state, a timer is initialized for restarting the interface. The value of this timer is equal to the value of the "holding timer" of the interface in question.

When an adjacency is in the "2-way check" state, the following sequence of events is provided, depending on the type of adjacency.

PTP Adjacency

If a PDU packet of the CSNP link state group type or the LSP link state type is received, the adjacency is marked as being in the active or UP state, and the data packet is processed in the manner specified in the IS—IS protocol standard.

If an IIH PDU packet is received, several circumstances can be distinguished:

The IIH PDU Packet Presents an Adjacency State Option Field:

If the adjacency state option field is UP (and possibly if other option state fields are included in the PDU and all corresponding to the adjacency state), the adjacency is marked as being in the synchronized state SYNC in the database.

If the adjacency state option field is not UP (or possibly if other state option fields are included in the PDU and do not all correspond to the adjacency state), then the adjacency is marked as being in the initialization state INITIALIZE in the database.

The IIH PDU Packet does not have the Adjacency State Option Field:

If the source identification and the local circuit fields of the received PDU packet correspond to adjacency, then the adjacency is marked as being in the synchronized state SYNC. Otherwise the adjacency is marked as being in the initialization state INITIATE in the database.

LAN Adjacency

If a PDU packet of the CSNP type is received, if this packet indicts that the router 1 is part of the adjacencies of the sending router, and if the sending router is marked as being in the "2-way check" state in the database of router 1, then the adjacency of the sending router is marked as being in the UP state. The received PDU data packet is then processed in the manner specified in the IS—IS protocol standard.

If an IIH PDU packet is received, the list of MAC addresses contained in the adjacent routers option field of the PDU packet is examined. Thereafter a search is made to see whether the MAC address of router 1 is present in the list of MAC addresses that have been examined.

The LAN-ID field of the received PDU packet is also examined to determine whether router 1 serves as a designated router or DIS of level 1 or level 2.

Thereafter, a search is made for an adjacency whose MAC address corresponds to the MAC address of the sender of the PDU packet.

If this adjacency is found and if it is marked as being in the "2-way check" state, then:

if the MAC address of router 1 is present in the list of MAC addresses in the adjacent routers field of the received PDU packet, the adjacency state is marked as being in SYNC; or if the MAC address of router 1 is not in the list of the adjacent routers field of the received PDU packet, then this adjacency is deleted.

If no adjacency is found or if it is not marked as being in the "2-way check" state, the data packet is processed as being a normal data packet coming from said adjacency.

When an adjacency is in the SYNC state, the router 1 is informed that both-way communication with the corresponding adjacent router is operational. However router 1 does not know whether the link states previously transmitted by the adjacent router and stored by the standby protocol engine are up to date. There therefore follows a detailed description of a step of synchronizing adjacencies concerning link states.

Synchronization for a PTP Adjacency

If a PDU data packet of CSNP type is received and if the adjacency corresponding to the sending router is marked as being in the SYNC state, then the adjacency is marked as being UP. The received PDU packet is then processed in the manner defined by the IS—IS protocol standard.

If a PDU packet of a type other than CSNP is received and if the adjacency corresponding to the sending router is marked as being in the SYNC state, the adjacency is then marked as being UP. The received PDU packet is then processed in the manner defined in the IS—IS protocol standard.

Synchronization for a LAN Adjacency

If a PDU data packet of CSNP type is received, if the adjacency corresponding to the sending router is marked as being in the SYNC state, and if router 1 is not the DIS, then the adjacency is marked as being in the UP state. The PDU packet is then processed in the manner defined in the IS—IS protocol standard.

If a PDU data packet of a type other than CSNP is received from an adjacent sending router, the adjacency remains marked as being in the SYNC state. The PDU packet is then processed in the manner defined in the IS—IS protocol standard.

There follows a description of the behavior of the activated protocol engine 3 that was initially on standby, in the event of an interface restarting timer timing out.

Timeout for a PTP Interface

A search is initially made in the adjacency corresponding to the interface that has timed out.

If the adjacency is marked as being in the "2-way check" state, it is deduced that the router corresponding the adjacency has become unavailable during the period between failure of the active protocol engine and activation of the standby protocol engine. The adjacency corresponding to this router is then deleted.

If the adjacency is marked as being in the SYNC state, then the state of this adjacency is not changed. A PDU packet of the CSNP type is sent. This CNSP PDU packet contains an LSP corresponding to the adjacency and having a checksum that has been deliberately altered so as to be invalid (i.e. so as to have a value that does not correspond to the value stored in the link state database of the activated engine 3 that was initially on standby). Thus, the adjacent router in question responds to the CSNP PDU packet by sending an LSP update to router 1 in order to replace the deliberately invalid LSP, together with other LSPs that might not have been recorded prior to activation of the standby protocol engine.

If the adjacency remains in the SYNC state, then the timer is reinitialized. Provision can be made to count the number of timeouts. The adjacency is then deleted if the number of timeouts reaches a determined threshold.

For other markings of the state of adjacency, timeout is ignored.

By repeating the process for the various interfaces, by the end of activation, the database of the activated protocol engine 3 that was initially on standby contains only UP adjacency states. Thus, only those adjacencies that are active remain marked in the database.

Timeout for a LAN Interface

Initially, a search is made in all of the adjacencies corresponding to the interface that has timed out.

If an adjacency is marked as being in the "2-way check" state, it is deduced that the router corresponding to the adjacency became unavailable in the period between the active protocol engine failing and the standby protocol engine being activated. The adjacency corresponding to this router is therefore deleted.

If an adjacency is marked as being in the SYNC state, and if the router 1 is the DIS router, then the state of this adjacency is marked as being UP. If a CSNP type PDU packet has not already been sent for this interface, such a packet is sent now. This CSNP PDU packet includes all of the link states of level identical to that of the adjacency in its database.

If an adjacency is marked as being in the SYNC state, and if router 1 is not the DIS router, the state marking of this adjacency is not modified.

If at least one adjacency of the interface remains in the SYNC state, the timer is reinitialized. Provision can be made to count a number of timeouts. The adjacencies of the interface are then deleted if the number of timeouts reaches a determined threshold.

For other markings of the adjacency state, timeout is ignored.

By repeating the process for the various interfaces, by the end of activation the database of the activated protocol engine 3 that was previously on standby contains only UP adjacency states. Thus, only those adjacencies which are active remain marked in the database.

There follows a description of a possible extension to the IS—IS protocol for facilitating the step of activating the standby protocol engine. It is proposed to integrate a new option requesting that a CSNP be sent in IIH (IS—IS hello) PDU data packets. A sender router compatible with the extension could then, for example, integrate the following fields in an IIH PDU:

Field "CSNP request type": a predetermined field value can be provided for which the sending of a CSNP is requested of the destination as soon as possible. The destination router must be marked as being in the UP state in the adjacency database and the sending router must not be the DIS router in the case of a LAN type subnetwork.

If a destination router compatible with the extension to the IS—IS protocol receives the IIH PDU packet, it performs the following processing:

If the packet comes from a LAN type subnetwork for which the destination router serves as a DIS, and if the adjacency corresponding to the sending router is in the UP state, a CSNP packet is sent as soon as possible by the destination.

If the IIH PDU packet comes from a PTP subnetwork, and if the adjacency corresponding to the sending router is in the UP state, a CSNP packet is sent as soon as possible by the destination.

Else, the option field is ignored and the destination router does not send a CSNP packet. As explained above, the marking of the adjacency state can be deleted when no data packet has been returned from the adjacency after repeated timeouts.

If a destination router that is not compatible with the protocol extension receives the IIH PDU packet, the option field is ignored.

In all cases, the remainder of the IIH PDU packet is processes normally by the destination router.

Overall, the marking of the adjacency state is modified as a function of the nature of the response received from the adjacent router. Naturally, it is considered that the absence of any response from the adjacent router constitutes a response of a particular kind.

The method described makes it possible to reduce router unavailability and to make the failure of a protocol engine invisible to other routers. Activation of the standby protocol engine is thus not detected by the other routers.

The present embodiments and examples should be considered as being given by way of non-restrictive illustration and the invention is not limited to the details provided herein, but may be modified while remaining within the scope of the accompanying claims.

What is claimed is:

1. A method of controlling a router in an autonomous system, the router being in communication with other routers using an IS—IS protocol via interfaces and presenting:
    an active IS—IS protocol engine; and
    a standby IS—IS protocol engine;
    the method comprising:
    communicating with other routers via the active protocol engine;
    storing at least one of: data concerning the adjacency of the other routers, data concerning the state of links with the other routers, and data concerning the interfaces in a memory of the active protocol engine;
    updating the data stored in a memory of the standby protocol engine on the basis of the data in the active router concerning the adjacency, the state of the links, and the interfaces, wherein the data is updated if there is detection of at least one of: a modification to activating adjacency, a modification to deactivating adjacency, and modification to adjacency data due to receiving a packet declaring presence; and
    activating the standby protocol engine with the updated data, by using the IS—IS protocol with the other routers.

2. The method of claim 1, wherein all of the data is updated at the request of the standby protocol engine.

3. The method of claim 1, further comprising a step of detecting a modification of the data stored in a memory of the active protocol engine, with updating being performed whenever a modification of said data is detected.

4. The method of claim 3, wherein the detected modification is selected from the group constituted by: adjacency activation; adjacency deactivation; adjacency data being modified, after receiving a presence declaration packet; modifications, deletions, and creations relating to the states of links and of interfaces.

5. The method of claim 1, wherein the step of activating the standby protocol engine includes a step of validating the preserved adjacency and link state data without modifying the IS—IS protocol.

6. The method of claim 1, wherein, prior to being activated, the standby protocol engine performs a shortest path search on the basis of the updated data.

7. The method of claim 1, wherein activation of the standby protocol engine includes a step of verifying the validity of its adjacency data.

8. The method of claim 7, wherein validity verification comprises:
    sending an IS—IS hello type (IIH) data packet from the standby protocol engine to an adjacent router, the packet containing a request that the adjacent router send a data packet; and
    modifying the adjacency data as a function of the nature of the response from the adjacent router.

9. A communication method, the method comprising:
    sending an IIH PDU data packet from a first router to an adjacent second router, the packet including a parameter at a predetermined location;
    sending a CSNP data packet from the second router to the first router as a function of the value of said parameter of the IIH PDU data packet; and
    detecting one or more modifications to the data corresponding to the IIH PDU data packets, wherein the data is updated if there is detection of at least one of: a modification to activating adjacency, a modification to deactivating adjacency, and modification to adjacency data due to receiving a packet declaring presence.

10. The communication method according to claim 9, wherein the IIH PDU data packet contains a request for a CSNP data packet to be sent.

11. A router presenting a plurality of interfaces via which it is capable of communicating with other routers using an IS—IS protocol, the router comprising:
    an active IS—IS protocol engine;
    a standby IS—IS protocol engine;
    a communications channel between the protocol engines;
    a least one data storage memory in communication with the active protocol engine;
    a detector that detects one or more modifications to the data in the memory of the active protocol engine, wherein the data is updated if there is detection of at least one of: a modification to activating adjacency, a modification to deactivating adjacency, and modification to adjacency data due to receiving a packet declaring presence; and
    at least one data storage memory in communication with the standby protocol engine.

* * * * *